(12) United States Patent
Fleming et al.

(10) Patent No.: US 6,759,110 B1
(45) Date of Patent: Jul. 6, 2004

(54) STRUCTURED RELEASE LINERS WITH IMPROVED ADHESION TO ADHESIVE ARTICLES

(75) Inventors: Danny Leroy Fleming, Stillwater, MN (US); Frank Thomas Sher, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 73 days.

(21) Appl. No.: 09/638,346

(22) Filed: Aug. 15, 2000

(51) Int. Cl.[7] .................. B32B 7/00; A61F 13/02; E04F 15/16
(52) U.S. Cl. ............ 428/41.8; 428/40.1; 428/156; 428/192; 428/194
(58) Field of Search .................. 428/40.1, 156, 428/192, 194, 41.8; 427/198

(56) References Cited

U.S. PATENT DOCUMENTS

| | | | |
|---|---|---|---|
| RE24,906 E | 12/1960 | Ulrich | 206/59 |
| 3,239,478 A | 3/1966 | Harlan, Jr. | 260/27 |
| 3,935,338 A | 1/1976 | Robertson | 427/207 |
| 4,181,752 A | 1/1980 | Martens et al. | 427/54.1 |
| 4,952,650 A | 8/1990 | Young et al. | 526/194 |
| 5,169,727 A | 12/1992 | Boardman | 428/447 |
| 5,296,277 A | 3/1994 | Wilson et al. | 428/40 |
| 5,462,765 A | * 10/1995 | Calhoun et al. | 427/198 |
| 5,650,215 A | * 7/1997 | Mazurek et al. | 428/156 |
| 5,897,930 A | * 4/1999 | Calhoun et al. | 428/41.8 |

FOREIGN PATENT DOCUMENTS

| | | | |
|---|---|---|---|
| DE | 8414618 | 9/1986 | C09J/7/02 |
| JP | 09141812 | 6/1997 | B32B/29/06 |
| WO | WO 98/29516 | 9/1998 | C09J/7/02 |
| WO | WO 99/35201 | * 7/1999 | |
| WO | WO 00/44843 | 8/2000 | C09J/7/02 |
| WO | WO 00/69985 | 11/2000 | C09J/7/02 |

OTHER PUBLICATIONS

Copending Application 09/311,101, Mikami et al., May 13, 1999.*

* cited by examiner

*Primary Examiner*—Harold Pyon
*Assistant Examiner*—Brian P. Egan
(74) *Attorney, Agent, or Firm*—Colene H. Blank

(57) ABSTRACT

A release liner includes a surface with an arrangement of structures thereon, wherein the structures extend upward from a plane of the surface, and wherein the structures have at least one sidewall that makes an angle with respect to the plane of the surface of greater than 0° and less than 90° selected to enhance adhesion to a tape.

11 Claims, 2 Drawing Sheets

STRUCTURED RELEASE LINERS WITH IMPROVED ADHESION TO ADHESIVE ARTICLES

This invention relates to release liners for adhesive backed articles. More particularly, the invention relates to a release liner for an adhesive backed article that has modified surface geometries that enhance adhesion to handling tapes such as pre-mask tapes, pre-space tapes, splicing tapes and the like.

BACKGROUND

Pressure sensitive adhesive-backed films may be imaged and adhered to a substrate for decorative purposes. For example, large graphics or smaller decals may be placed on vehicles or may be used as signs for identification, promotional or decorative objectives. However, the tacky and aggressive pressure sensitive adhesives used in these applications cause considerable handling and application problems. Ideally, the film is adhered conformably and evenly on the application substrate. Adhesive-backed articles that adhere with the slightest contact can often be particularly difficult to reapply if they inadvertently adhere to the substrate in an undesired position. In addition, even if one section of the adhesive backed article is properly positioned on a substrate, and the film is firmly adhered, air or other fluids may be trapped under the article. The trapped air forms a bubble in the article, and cannot be easily removed without de-bonding or perforating the article.

The adhesive backed graphic articles described in U.S. Pat. No. 5,897,930, WO 98/29516 and U.S. Ser. No. 09/311,101 (3M File No. 54528USA2A) include an adhesive layer with a plurality of replicated recessed interconnecting microchannels that allow egress of fluids trapped under the article during registration with the substrate. A typical article 10 of this type is shown in FIG. 1, and includes a film 12 having opposed surfaces 14 and 16. The surface 14 of the film 12 is imaged to form a graphic 13. A layer of a pressure sensitive adhesive 18 is bonded to the surface 16 of the film 12. The pressure sensitive adhesive 18 includes a surface 20 that can be bonded to a substrate. The pressure sensitive adhesive 18 includes structures 22 that define a network of channels 24. A release liner 26 is releasably attached to the pressure sensitive adhesive 18. The release liner 26 includes protrusions 28 that form the corresponding channels 24 and structures 22 in the pressure sensitive adhesive 18. The release liner 26, shown in a partially removed state, is fully detachable when pulled in the direction of arrow A and is used to protect the pressure sensitive adhesive prior to application of the article 10 on a substrate.

SUMMARY

As the adhesive backed graphic articles shown in FIG. 1 are manufactured, a splicing tape may be used in the production process to adhere the protective release liner (See 26 in FIG. 1) from one roll onto the release liner from another roll. Prior to application to a substrate, pre-mask or pre-space tapes may be used to protect the graphics, aid in handling the graphic article, or to transfer cut graphics from the liner into proper registration with the substrate. If the graphics are cut and a portion of the surrounding un-imaged film and adhesive layer are removed, the release liner is exposed, and the pre-mask and pre-space tapes should adhere sufficiently to the release liner to allow transfer of the graphic article into proper registration with the substrate.

If a release liner includes a network of continuous ridges spaced closely together (See 28 in FIG. 1), only a relatively small surface area on the tops of the ridges is available for bonding to a pre-mask, a pre-space, or a splicing tape. The closely spaced ridges also make it more difficult for the tapes to contact and adhere to the relatively flat land areas between the ridges. The pre-mask, pre-space or splicing tapes have specific conformability and adhesion requirements that enable them to perform their protective and transferability functions, and these requirements cannot be easily modified to enhance adhesion to a release liner.

Rather than chemically modify the pre-mask, pre-space or splicing tapes to enhance adhesion to a release liner, the invention seeks to mechanically modify the features on the release liner itself to allow the tapes to more effectively adhere to the liner. The release liners of the invention include structures with geometries that improve the adhesion of tapes to the liner without sacrifice of the application, bonding and visual properties of the final graphic film product.

In a first embodiment, the invention is a release liner having a surface with an arrangement of protruding structures thereon. The structures extend upward from a plane of the surface and have at least one sidewall that makes an angle with respect to the plane of the surface of greater than 0° and less than 90° selected to enhance adhesion to a handling tape such as a pre-space tape, a pre-mask tape, a splicing tape and the like. Preferably, the structures have at least one sidewall that makes an angle of less than about 50° with respect to the plane of the surface.

In a second embodiment, the invention is an adhesive backed article including:
   (a) a release liner having a surface with an arrangement of structures thereon, wherein the structures extend upward from a plane of the surface, and wherein the structures have at least one sidewall that makes an angle with respect to the plane of the surface of greater than 0° and less than 90° selected to enhance adhesion to a handling tape; and
   (b) an adhesive layer on the surface of the release liner.

In a third embodiment, the invention is a method of enhancing the adhesion of a tape to a release liner, comprising providing on the release liner an arrangement of structures extending upward from a plane of the surface, wherein the structures have at least one sidewall that makes an angle with respect to the plane of the surface of greater than 0° and less than 90° selected to enhance adhesion to the tape.

In a fourth embodiment, the invention is a method of transferring an adhesive backed article with a release liner and an adhesive layer on the release liner. The method includes attaching a tape to the release liner, wherein the release liner has an arrangement of structures extending upward from a plane of a surface of the liner. The structures have at least one sidewall that makes an angle with respect to the plane of the surface of greater than 0° and less than 90° selected to enhance adhesion to the tape.

In a fifth embodiment, the invention is a method of transferring a graphic article including:
   (a) providing a graphic article including:
      a film with a first surface and a second surface, wherein an image occupies at least a portion of the first surface;
      an adhesive layer on the second surface of the film;
      a release liner on the adhesive layer, wherein the release liner comprises a surface with an arrangement of structures thereon, wherein the structures extend upward from a plane of the surface, and wherein the structures have at least one sidewall that makes an angle with respect to the plane of the surface of greater than 0° and less than 90° selected to enhance adhesion to a handling tape;

(b) removing the film and the adhesive layer under portions of the first surface not occupied by the image such that at least a portion of the surface of the release liner is exposed;

(c) attaching a handling tape to the image and the exposed portion of the release liner; and (d) transferring the article into registration with a substrate.

In an optional additional step, the handling film is removed from the substrate and the graphic article.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
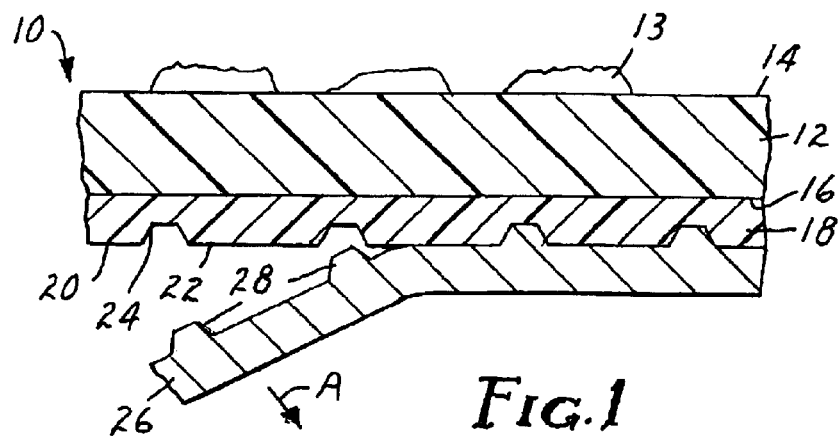
FIG. 1 is a cross-sectional view of an adhesive-backed graphic article.
Figure 2:
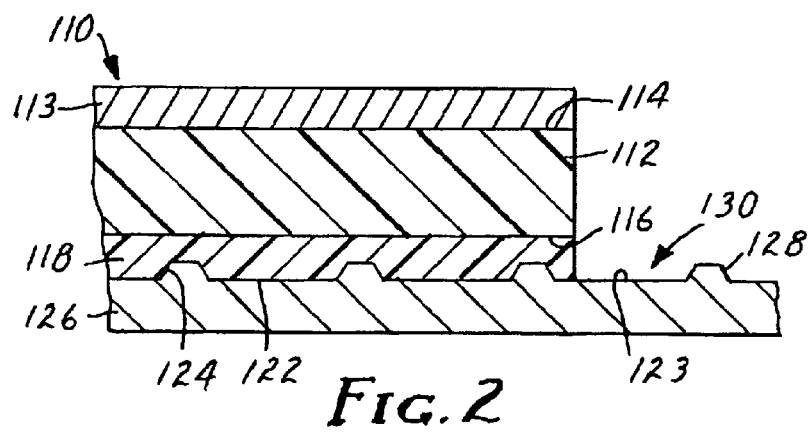
FIG. 2 is a cross-sectional view of the adhesive backed article of FIG. 1 with portions of the film layer and adhesive layer cut away to expose the release liner.

Referring to FIG. 2, an adhesive backed graphic article 110 is shown that includes a film 112. The film 112 may vary widely depending on the intended application, and may be made of a wide variety of materials such as, for example, polymeric films, metal foils, metal plates, ceramic plates, foamed sheets, and reflective sheeting. The film 112 is preferably made of a polymeric material used conventionally by those skilled in the art. Suitable polymeric films include, for example, vinyl, polyvinyl chloride, plasticized polyvinyl chloride, polyurethane, polyethylene, polypropylene, fluororesin and the like. The thickness of the film can vary widely according to a desired application, but is usually about 300 µm or less, and preferably about 25 µm to about 100 µm.

The film 112 is bonded on a first surface 116 to a layer of a pressure sensitive adhesive 118. Any pressure-sensitive adhesive is suitable for the layer 118. Classes of pressure-sensitive adhesives include acrylics, tackified rubber, tackified synthetic rubber, ethylene vinyl acetate, silicone, and the like. Suitable acrylic adhesives are disclosed, for example, in U.S. Pat. Nos. 3,239,478, 3,935,338, 5,169,727, RE 24,906, 4,952,650, and 4,181,752. A suitable class of pressure-sensitive adhesives is the reaction product of at least one alkyl acrylate with at least one reinforcing comonomer. Suitable alkyl acrylates are those having a homopolymer glass transition temperature below about −10° C. and include, for example, n-butyl acrylate, 2-ethylhexylacrylate, isoctylacrylate, isononyl acrylate, octadecyl acrylate and the like. Suitable reinforcing monomers include, for example, acrylic acid, itaconic acid, isobornyl acrylate, N,N-dimethylacrylamide, N-vinyl caprolactam, N-vinyl pyrrolidone, and the like.

The adhesives may be polymers that are dispersed in solvent or water and coated onto the release liner and dried, and optionally crosslinked. If a solventborne or waterborne pressure-sensitive adhesive composition is employed, then the adhesive layer may undergo a drying step to remove all or a majority of the carrier liquid. Additional coating steps may be necessary to achieve a smooth surface. The adhesives may also be hot melt coated onto the liner or microstructured backing. Additionally, monomeric pre-adhesive compositions can be coated onto the liner and polymerized with an energy source such as heat, UV radiation, e-beam radiation, and the like.

The thickness of the adhesive may vary widely depending on the intended application, and typically ranges from about 10 µm to about 50 µm.

The pressure sensitive adhesive can optionally include one or more additives such as, for example, initiators, fillers, plasticizers, tackifiers, chain transfer agents, fibrous reinforcing agents, woven and non-woven fabrics, foaming agents, antioxidants, stabilizers, fire retardants, viscosity enhancing agents, coloring agents, and mixtures thereof.

Figure 3:
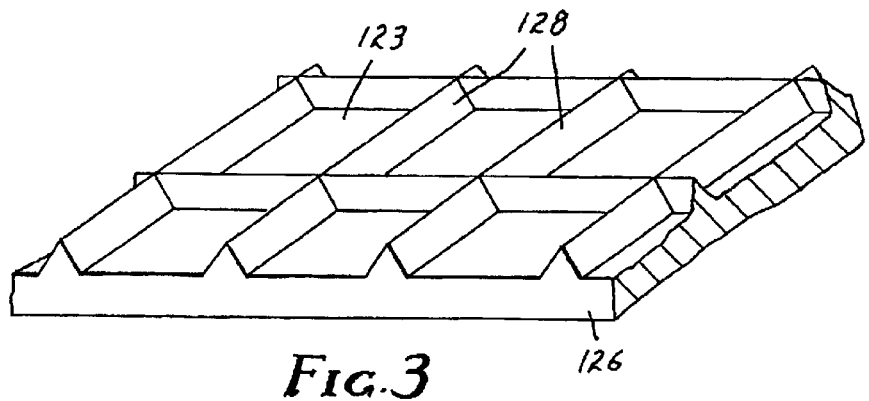
FIG. 3 is a perspective view of a release liner suitable for forming a structured surface in an adhesive layer.

Referring to FIG. 3, a removable release liner 126 includes ridge-like protrusions 128. The adhesive layer 118 includes corresponding channels 124 and land areas 122. The protrusions 128 in the liner 126 may be made as described in WO 98/29516 and U.S. Pat. No. 5,650,215, which are incorporated herein by reference. The topography may be created in the liner 126 by any contacting technique, such as casting, coating or compressing. The topography may be made by at least one of: (1) casting the liner on a tool with an embossed pattern, (2) coating the liner onto a tool with an embossed pattern, or (3) passing the liner through a nip roll to compress the liner against a tool with an embossed pattern. The topography of the tool used to create the embossed pattern in the release liner 126 may be made using any known technique, such as, for example, chemical etching, mechanical etching, laser ablation, photolithography, stereolithography, micromachining, knurling, cutting or scoring.

The adhesive layer 118 is preferably coated on an embossed release liner 126 to create the embossed pattern. When the release liner 126 is removed, the adhesive layer 118 has a topography with structures and land areas that is essentially the reverse of the topography of the structures areas on the release liner 126. A typical release liner 126 with one preferred pattern of structures, ridge like protrusions 128, is illustrated in FIG. 3.

The liner 126 may be any release liner or transfer liner known to those skilled in the art that is capable of being embossed as described above. The liner 126 should also be capable of being placed in intimate contact with a pressure sensitive adhesive and subsequently removed without damaging the adhesive layer. Non-limiting examples of liners include materials from Minnesota Mining & Manufacturing Company (3M) of St. Paul, Minn., Rexam Corporation of Iowa City, Iowa, or Daubert Coated Products of Westchester, Ill. The liner 126 is typically a polymer coated paper with a silicone release coating, a polyethylene coated polyethylene terepthalate (PET) film with silicone release coatings, or a cast polypropylene film with a silicone release coating. The liner 126 may also include structures designed to enhance the positionability of the adhesive article such as, for example, those in products available from 3M under the trade designation Controltac.

Referring again to FIG. 2, a graphic 113 is imaged on a second surface 114 of the film layer 112. In FIG. 2, the film layer 112 and the adhesive layer 118 have been carefully cut away around the graphic 113. The area of the film 112 and adhesive 118 not overlain by the graphic 113 have been removed to expose a portion 130 of the structured surface of the release liner 126.

Figure 4:
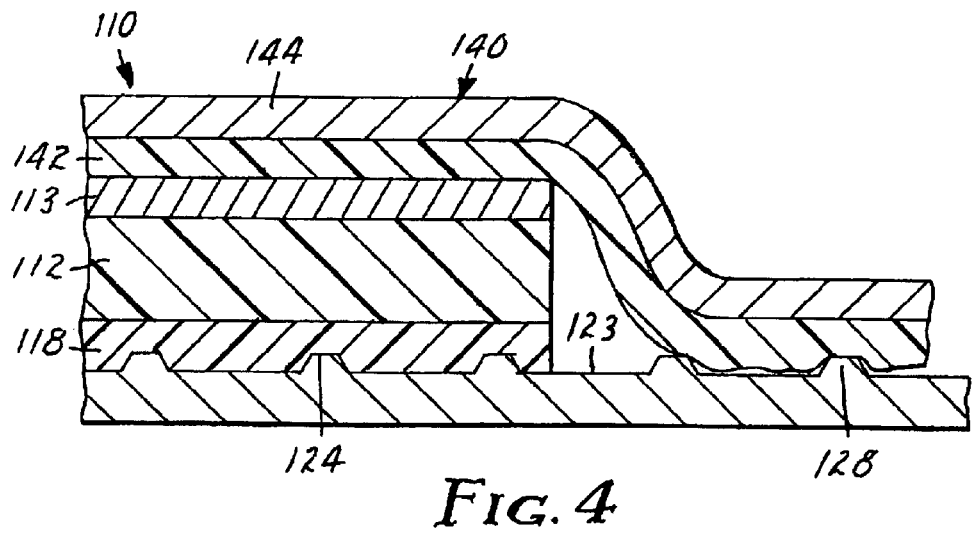
FIG. 4 is a cross-sectional view of the adhesive backed article of FIG. 2 with a second protective or transfer film applied thereto.

As shown in FIG. 4, once the film and adhesive not overlain by the graphic 113 are removed, a second tape 140 may be applied over the graphic 113 and/or the release liner 126. The tape 140 may be used to protect the graphic 113 from damage during handling, or may be a pre-mask or pre-space tape to facilitate transfer and registration of the construction 110 with respect to a substrate. The tape 140 may also be a splicing tape used to temporarily join the release liner 126 to another release liner (not shown in FIG. 4). Generally, the tape 140 includes a film layer 144 and an adhesive layer 142. The tape 140 may also include other layers depending on its intended function, and these layers will not be detailed here. When the tape 140 contacts the release liner 126, the film layer 144 is typically sufficiently stiff that the tape adhesive layer 142 cannot completely conform to the topography of the release liner 126. This results in insufficient adhesion between the tape 140 and the release liner 126, particularly if the ridge-like protrusions on the release liner 126 are numerous and closely spaced.

The liner 126 of the invention includes a structured pattern on an exposed surface suitable for contact with an adhesive. This pattern includes a configuration of protruding structures in which at least two dimensions of the structures are preferably microscopic, i.e. the topical and/or cross-sectional view of the structures is preferably microscopic. The term microscopic as used herein refers to dimensions that cannot be resolved by the human eye without aid of a microscope. The structures may be present in either a random array of structures or in regular patterns. Selected patterns could include rectilinear patterns, polar patterns and other conventional regular patterns.

The shapes of the structures extending upward from a plane of the surface of the liner 126 can vary widely depending on the intended application of the adhesive layer 118. Examples of structure shapes include but are not limited to hemispheres, prisms (such as square prisms, rectangular prisms, cylindrical prisms and other similar polygonal features), pyramids, or ellipsoids. Combinations of the different structure shapes can be utilized. The preferred shapes include hemispheres, prisms, and pyramids. Each individual structure should typically have a height of greater than about 3 $\mu$m but less than the total thickness of the adhesive layer, and preferably about 3 $\mu$m to about 50 $\mu$m.

Figure 5A:
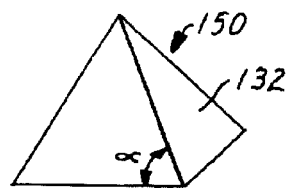
FIG. 5a is a perspective view of one embodiment of a structure on a release liner according to the invention.

FIG. 5A illustrates a quadrangle pyramid 150 as an illustration of one embodiment suitable for use as structure in the liner 126 of the invention. The structure 150 includes at least one sidewall 132 that makes an angle $\alpha$ with respect to a plane of the surface of the liner 126. The angle $\alpha$ may be selected from an angle greater than 0° and less than 90°, measured with respect to the plane of the surface of the liner 126, necessary to provide enhanced levels of adhesion between the liner 126 and the adhesive layer 142 on a handling film 140. The angle $\alpha$ is preferably less than about 50°, more preferably about 30° to about 50°.

Figure 5B:
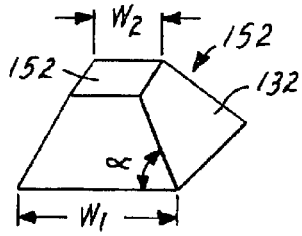
FIG. 5b is a perspective view of one embodiment of a truncated structure on a release liner according to the invention.

FIG. 5B depicts a truncated quadrangle pyramid 151 that may also be used as a structure in the liner 126. The structure 151 has at least one sidewall 132 that makes an angle $\alpha$ with respect to a plane of the surface of the liner 126. The angle $\alpha$ may be selected from an angle greater than 0° and less than 90°, measured with respect to the plane of the surface of the liner 126, necessary to provide enhanced levels of adhesion between the liner 126 and the adhesive layer 142 on a handling film 140. The angle $\alpha$ is preferably less than about 50°, more preferably about 30° to about 50°. The truncated structure 151 has a base with a width $W_1$ and a flat top surface 152 with a width $W_2$.

The structures in the liner 126 are preferably substantially continuous. The term substantially continuous as used in this application means a pattern of structures that creates a substantially uninterrupted network of channels in the adhesive layer. The continuous pattern of structures either terminates at the peripheral portion of the liner or communicates with other structures that terminate at a peripheral portion of the liner. The continuous structures are preferably substantially linear, and may be overlapping or non-overlapping. The structures in the liner 126 are also preferably substantially regular. The term regular means a pattern of structures that has a regular repeating pattern over at least a portion of the surface of the liner, preferably over the entire surface of the liner.

In a preferred embodiment, the regular and continuous structures are substantially linear ridges 128 that extend upwardly from a plane of a surface of the release liner 126. The ridges 128 may be overlapping or non-overlapping. As described in WO 98/295,116, incorporated herein by reference, the ridges 128 should be sized according to the following design considerations. First, the ridges should preferably be sufficiently large to allow egress of fluids to the periphery of the article, but not so large as to allow ingress of unwanted fluids beneath the article. Second, the ridges 128 should also not be so large as to detract from the appearance of the exposed surface of the film 112, particularly if the film 112 is to be imaged. Third, the ridges 128 should not be so large as to detract from the adhesive bonding performance of the article. In one preferred embodiment, the ridges 128 overlap one another in a cross-hatched pattern, and the cross-hatched pattern is angled about 45° with respect to an edge of the liner 126. When the release liner 126 is removed from the adhesive layer and the article 110 is applied to a substrate, the channels in the adhesive layer created by the ridges in the release liner allow fluid trapped at the interface between the adhesive and the substrate to escape to a periphery of the article and be exhausted into the surrounding atmosphere.

The cross-sectional shape of the ridges 128 can vary widely according to the processing methods used to make them, but each preferably has a V-shaped or trapezoidal cross section on observation in a transverse direction. The limits of dimensions of the ridges can be described by their aspect ratio. The aspect ratio is defined as the ratio, in a cross sectional view perpendicular to: (1) the plane of the liner 126, and (2) the longitudinal direction of a ridge 128, of the greatest microscopic dimension of the ridge parallel to the plane of the liner (See $W_1$ in FIG. 6) to the greatest microscopic dimension of the ridge channel perpendicular to the plane of the liner (See W2 in FIG. 6). Depending on the specific type of ridge and the ridge design considerations outlined above, the limits of the aspect ratio are preferably about 0.1 to about 100, more preferably about 1 to about 10.

Figure 6:
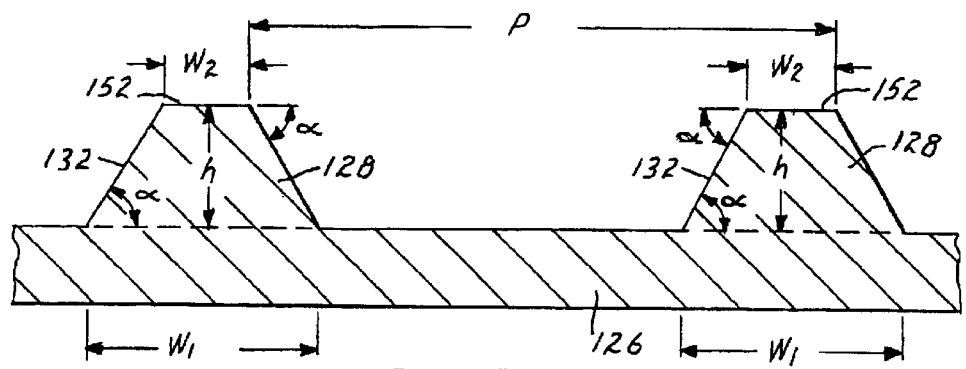
FIG. 6 is a cross-sectional view showing the dimensions of a structure on a surface of a release liner according to the invention.

In the adhesive-backed article of the invention, the structures have a specific shape and a size to provide enhanced adhesion to a handling tape. FIG. 6 demonstrates the dimensions and characteristics of the structures on the surface of the liner 126 of the invention that provide this enhanced level of adhesion.

Referring to FIG. 6, the liner 126 has structures that form a plurality of ridges 128. The pitch P between the ridges 128 may be about 125 μm to about 2500 μm, preferably about 150 μm to about 1300 μm. The height h of each ridge 128 from a plane of the liner 126 is about 3 μm to about 45 μm, preferably about 10 μm to about 30 μm. The width of the ridge 128 $W_1$ at its base is less than about 200 μm. The distance across the top 152 of the ridge 128 is about 0 μm to about 200 μm. The ridge 128 has at least one sidewall 132 that makes an angle α with respect to a plane of the surface of the liner 126. The angle α may be selected from an angle greater than 0° and less than 90°, measured with respect to the plane of the surface of the liner 126, necessary to provide enhanced levels of adhesion between the liner 126 and the adhesive layer 142 on a handling film 140. The angle α is preferably less than about 50°, more preferably about 30° to about 50°. This angular profile increases adhesion between the liner 126 and a tape 140 (See FIG. 4).

The above-described article can be applied to a variety of substrates, including smooth air-tight surfaces. Examples of suitable substrates include glass, metal, plastic, wood, and ceramic substrates, painted surfaces of these substrates, imaged films, sign faces, and the like. Representative plastic substrates include polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers.

The invention will now be described with reference to the following non-limiting examples.

EXAMPLES

Liner and adhesive samples were evaluated using light microscopy with a JENA JENAVERT (Jena, Germany) incident light microscope or Bausch and Lomb stereo microscope (Bausch & Lomb, Rochester, N.Y.), or interferometry microscopy using a WYKO RST surface profiler (WYKO Corp., Tucson, Ariz.).

Tests:

Tape to Liner Peel Adhesion Test:

Two inch wide strips of tapes are adhered to the release or microstructured face of the liners by lamination at 40 psi using a roll laminator (Robert L. Greig, Inc.) having 3 inch (7.6 cm) diameter by 32 inch (81 cm) wide 60D durometer rollers and ⅝ inch (1.6 cm) diameter rams. The tapes are peeled at a constant 180° angle from the laminated samples after the indicated dwell conditions using an IMASS adhesion tester set for a rate of 90 inches/minute (229 cm/min). The tape to liner adhesion measurement may be reported in grams per inch width or grams per two inch width. Low tape to liner adhesions, for example less than 5 g/2 inch (5 cm) width, can result in the tape curling up off of the liner or falling off of the liner without extreme handling precautions. Tape adhesion for adequate performance is dependent on the use of the product. For example, in some cases it may be desired to have adhesion not too much less than 25 g/2 inch (5 cm) width. The types of tapes are recorded with the results.

Graphic to Substrate Peel Adhesion Test:

Adhesion tests of the graphics to substrates are a modification of ASTM method D3330 (1992) and Pressure Sensitive Tape Council method PSTC-1 (1989). Caustic etched and acid desmut aluminum test panels (6061 T6, Q-Panel Co., Phoenix Ariz.) and painted aluminum test panels (Fruehauf, Indianapolis, Ind.) are cleaned with a solvent available from E. I. DuPont de Nemours, Wilmington, Del., under the trade designation PrepSol, and allowed to dry. Samples of pressure sensitive adhesive and film on liner are cut into 2.54 cm wide strips. The release liner is removed, and the strips are applied to the panels using either a PA-1 Hand Applicator (available from Minnesota Mining and Manufacturing Company (3M) St. Paul Minn.) at a speed of about 2.5 centimeter/second or a Vanquisher roll laminator (Stoughton Machine and Manufacturing Co., Inc., Stoughton Wisconsin) at 40 psi gauge pressure and a speed of about 2.5 cm/second. A backing strip of 2.54 centimeter wide film available from 3M under the trade designation Scotchcal Series 3650 adhesive film is laminated in registration onto each sample strip. The backing film prevents the sample films and pressure sensitive adhesive from excessively stretching during peel back testing. After 24 hours in a constant temperature and humidity room at 22° C. and 50% relative humidity or after 7 days at 66° C. followed by 24 hour equilibration in the constant temperature and humidity room, peel adhesion is measured as a 180° peel back at a crosshead speed of 30.5 centimeters per minute using a Lloyd 500 tensile tester (Lloyd Instruments, Segensworth Fareham England). The samples may be processed or unprocessed. Processed film samples are coated with printing inks and transparent coatings.

Tenting of Graphic on Corrugations and Rivets and Overlap Test:

On a 12 inch by 4 inch (30.5 cm by 10 cm) corrugated Fruehauf painted panel having four 12 mm diameter by 2.5 mm high rounded rivets, is applied a test film having dimensions of 2.5 inch by 12 inch (6.4 cm by 30.5 cm). The film is applied to the test panel using a plastic squeegee, ensuring that the film conformed to the corrugations and completely cover the four rivet heads. A second piece of the same film, 1 inch by 12 inch (2.5 cm by 30.5 cm), is applied in the same manner on one edge of the first layer of applied film, such that about 0.5 inch (1.3 cm) width of the second strip overlaps and adheres to the first film and about 0.5 inch (1.3 cm) width of the second strip adheres only to the panel. The surrounding area around the rivet heads is heated with an electric heat gun to soften the film without melting it. Using a rivet brush, the film is brushed around the rivet heads so that the film is deformed, and tight, conforming bond is obtained between the film, the rivets and surrounding area, and in the valleys with no observable bridging of the film (tenting). The test panels are set aside for 24 hours at 72°' F. (22° C.)/50% relative humidity. After 24 hours the any lifting in the valleys, tenting around the rivet heads, and tendency of the overlap strip to peel back upon itself is evaluated. The test panels are placed in a 150° F. (66° C.) oven for 7 days and reevaluated.

Indent Panel Test:

A circular indent is made in 0.7 mm thick aluminum test panel using a hemispherical drop hammer with a tip diameter of 2.5 cm. The indent was about 2.8 cm diameter at the plane of the panel and was about 0.6 cm deep. A 7.5 cm by 7.5 cm test sample to be tested was centered over the indent and applied flat onto the panel and taut over the indent. A PA-1 Hand Applicator with a protective sleeve (SA-1, available from 3M) was used to press the sample onto the panel using a mass of about 1 kg. Then the film was pressed with a thumb into the depressed indent. At least 3 kg of mass was applied. The ability of the sample to conform into the indent and uniformly contact the depressed panel indent was rated as follows:

0 sample would not conform significantly into the indent against the entrapped air 1 sample could be pressed down into the indent to the extent of about 50%

2 sample could be pressed down to conform with much of the indent leaving small air bubbles 3 sample could be pressed down to conform slowly (greater than 5 seconds) and completely into indent 4 sample could be pressed down to conform swiftly (less than 5 seconds) and completely into the indent Rivet Panel Test:

A test sample was manually pressed over a 12 mm diameter by 2.5 mm high rounded rivet onto a Fruehauf flat panel with rivets by starting at the edges of the sample 3.8 cm from the center of the rivet. The sample was pressed down, using both thumbs, with thumb pressure (approximately 750 g for each thumb) at the periphery using a circular motion to entrap a large air pocket under the film. The film was then pressed in at the edge of the air pocket towards the rivet keeping thumbs at opposite sides of the rivet and making half-circular motions in alternating directions with decreasing radii to keep the thumbs along the margin of the pocket (approximately 750 g for each thumb). The force was limited so as not to burst the film. This procedure ensured that a large air pocket was formed under the sample and was prevented from being pushed under the film, to the sample edge by debonding of the pressure sensitive adhesive. The time required for dissipating the air pocket and conforming the film to within 2 mm of the rivet was determined. If a large air pocket remained after 5 minutes of working the film, the diameter of the air pocket was determined. Samples with best air dissipation generally required less than about 30 to 60 seconds to conform the film up to the rivet. Poorest samples entrapped about a 35 mm (or larger) air pocket after 5 minutes of working application.

Rivet/Corrugated Panel Test:

A sample was applied by hand onto a 10 cm by 30.5 cm painted aluminum Fruehauf corrugated panel having four 12 mm diameter by 2.5 mm high rounded rivets. The sample was large enough to cover a substantial portion of the panel. The degree of ease of pressing the sample into the valleys and conformably onto the rivets to prevent air entrapment was evaluated.

EXAMPLES 1 to 14

Release liners were embossed to form patterns of protruding ridges on the front side surface. The liners generally had a 125$^c$ cm paper core, about 25$^c$ cm polyethylene with a matte finish on the back side, about 25$^c$ cm polyethylene with a glossy finish on the front side, and a commercial silicone coating on the glossy polyethylene side. Each set of patterns was formed under heat and pressure using an engraved embossing tool. Each engraved pattern was an array of two sets of intersecting parallel grooves forming a square grid array oriented 45 degrees from the axis of the tool. Comparative samples (Example 1) having no micro-embossed ridges were also evaluated. The area of the ridge tops relative to the area of the liner sample was calculated for each pattern and showed, at most, small or no increase relative to those having steeper slope sidewalls.

The liners were tested for Tape to Liner Adhesion using two representative handling tape available from 3M under the trade designations SCPS-53X and SCPS-55. In addition, the liners were tested using a modified version of SCPS-55. The results demonstrate that the liners having the ridge topography of this invention can result in improved adhesion of applied tapes and broaden the selection of useful tapes that can be used with products having these liners.

An acrylic pressure sensitive adhesive solution (described as Adhesive Solution 1 in U.S. Pat. No. 5,296,277 and modified with 18.5 phr of a resin available from Arizona Chemical Co. under the trade designation Nirez 2019, was coated onto the release liners and dried at 66° C. for 10 minutes to form an adhesive film about 32$^c$ cm thick. The exposed adhesive side of these samples was laminated at room temperature to a 46$^c$ cm thick plasticized, white flexible and conformable vinyl (PVC) film identical to that used in films available from 3M under the trade designation Controltac Plus Graphic Marking Film Series 180-10. The lamination used a Vanquisher roll laminator (Stoughton Machine and Manufacturing Co., Inc., Stoughton Wis.) at 200 kPa (30 psi) gauge pressure and a speed of about 2.5 cm/second to afford an essentially flat construction. Removal of the liner exposed an adhesive layer having essentially an inverse topography of relatively flat adhesive lands and continuous microchannels. The microchannels had essentially the same shape as the liner ridges. The adhesive backed films were evaluated for air bleed application performance (including the Indent Panel Test and the Rivet Panel Test), as well as general ease of application performance (e.g., the Rivet/Corrugated Panel Test). Adhesion and holding performance were evaluated using the Graphic to Substrate Peel Adhesion Test and Tenting of Graphic on Corrugations and Rivets and Overlap Test. The results showed excellent application, air bleed, and adhesion performance properties for the samples made from the liners of the current invention and were comparable or better than samples made from liner of Example 2. Samples from the comparative liner of Example 1 showed no air bleed properties.

TABLE 1

Prespace Tape I-Mass Adhesions after 1 hr/CTH, 24 hr/CTH, 24 hr/120 F. or 14 days/CTH
g/2" width at 90"/min (avg. of 3)

| Ridge Spacing on Center (microns) | Ridges Per inch | Nominal Sidewall Slope (degrees) | Typical Avg. Ridge Dimensions W1/W2/h (microns) | Total % area at top of ridge | Adhesion to SCPS-53X (g/2 inch width) | Adhesion to SCPS-55 (g/2 inch width) | Adhesion to Modified SCPS-55 (g/2 inch width) |
|---|---|---|---|---|---|---|---|
| No ridges | 0 | 0 | | | 97, 142, — | 110, 250, 400 | 190, 280, 400 |
| 1270 | 2 | 90 | 100/NA/28 | <5% | 2, 0, 0 | 8, 13, 9 | 60, 110, 266 |
| 1270 | 220 | 60 | 74/41/23 | 6% | 1, 6, 6 | 45, 86, 159 | 130, 280, 400 |
| 1270 | 220 | 45 | 90/30/25 | 5% | 12, 18, 15 | 36, 78, 159 | 120, 210, 376 |

TABLE 1-continued

Prespace Tape I-Mass Adhesions after 1 hr/CTH, 24 hr/CTH, 24 hr/120 F. or 14 days/CTH
g/2" width at 90"/min (avg. of 3)

| Ridge Spacing on Center (microns) | Ridges Per inch | Nominal Sidewall Slope (degrees) | Typical Avg. Ridge Dimensions W1/W2/h (microns) | Total % area at top of ridge | Adhesion to SCPS-53X (g/2 inch width) | Adhesion to SCPS-55 (g/2 inch width) | Adhesion to Modified SCPS-55 (g/2 inch width) |
|---|---|---|---|---|---|---|---|
| 1270 | 220 | 30 | 115/23/24 | 4% | 12, 18, 44 | 47, 84, 114 | 170, 210, 400 |
| 508 | 550 | 53 | 42/12/20 | 5% | 1, 1, 1 | 1, 3, 3 | |
| 508 | 550 | 30 | 68/13/18 | 5% | 4, 5, 6 | 15, 32, 33 | 80, 80, 240 |
| 339 | 787.5 | 72 | 25/9/25 | 5% | 1, 1, 1 | 2, 3, 3 | |
| 290 | 87.5 | 54 | 43/11/22 | 7% | 1, 1, 1 | 0, 0, 0 | |
| 254 | 1100 | 30 | 55/6/16 | 5% | 3, 5, 5 | 6, 11, 19 | 10, 10, 28 |
| 200 | 1127 | 57 | 24/4/15 | 4% | 1, 1, 1 | — | |
| 200 | 1127 | 56 | 24/6/15 | 6% | — | 0, 0, 0 | |
| 203 | 1125 | 54 | 41/12/20 | 11.5% | 1, 1, 1 | 4, 5, 10 | |
| 169 | 1150 | 30 | 67/7/18 | 8% | 3, 5, 5 | 5, 7, 13 | 10, 10, 24 |

A number of embodiments of the invention have been described. Nevertheless, it will be understood that various modifications may be made without departing from the spirit and scope of the invention. Accordingly, other embodiments are within the scope of the following claims.

What is claimed is:

1. A release liner comprising a surface with a pattern of substantially continuous structures thereon, wherein the structures extend upward from a plane of the surface, wherein the structures have a pitch of about 500 μm to about 2500 μm, and wherein the structures have at least one sidewall that makes an angle with respect to the plane of the surface of about 30° to about 50°.

2. The release liner of claim 1, wherein the structures are ridges.

3. The release liner of claim 2, wherein the ridges form a substantially regular pattern on the surface.

4. The release liner of claim 3, wherein the ridges have a trapezoidal cross-sectional shape with a flat top.

5. The release liner of claim 3, wherein the ridges are overlapping.

6. An adhesive backed article comprising:

(a) a release liner comprising a surface with a substantially continuous pattern of structures thereon, wherein the structures extend upward from a plane of the surface, wherein the structures have a pitch of about 500 μm to about 2500 μm, and wherein the structures have at least one sidewall that makes an angle with respect to the plane of the surface of about 30° to about 50°; and (b) an adhesive layer on at least a portion of the surface of the release liner.

7. The article of claim 6, wherein the structures are ridges, and wherein the ridges form a substantially regular pattern on the surface.

8. The article of claim 7, wherein the ridges have a substantially trapezoidal cross-sectional shape with a substantially flat top.

9. The article of claim 6, further comprising a film layer on a surface of the adhesive layer opposite the release liner.

10. The article of claim 9, wherein the film later is imaged on a surface opposite the adhesive layer.

11. The article of claim 9, further comprising a handling tape on at least one of the film layer and the release liner.

* * * * *

UNITED STATES PATENT AND TRADEMARK OFFICE
CERTIFICATE OF CORRECTION

PATENT NO. : 6,759,110 B1
APPLICATION NO. : 09/638346
DATED : July 6, 2004
INVENTOR(S) : Danny L. Fleming It is certified that error appears in the above-identified patent and that said Letters Patent is hereby corrected as shown below:

Column 9
Line 52, delete "125$^c$ cm" and insert -- 125µm --, therefore.

Line 52, delete "25$^c$ cm" and insert -- 25µm --, therefore.

Line 53, delete ""25$^c$ cm" and insert -- 25µm --, therefore.

Column 10
Line 26, delete "32$^c$ cm" and insert -- 32µm --, therefore.

Line 28, delete "46$^c$ cm" and insert -- 46µm --, therefore.

Column 12
Line 33, In Claim 8, delete "substantially" before "trapezoidal".

Line 33-34, In Claim 8, after "with a" delete "substantially".

Line 38, In Claim 10, delete "later" and insert -- layer --, therefore.

Signed and Sealed this

Twenty-ninth Day of May, 2007

JON W. DUDAS
*Director of the United States Patent and Trademark Office*